US007242410B2

(12) United States Patent
Frazer et al.

(10) Patent No.: US 7,242,410 B2
(45) Date of Patent: Jul. 10, 2007

(54) COLOR CONVERSION METHOD AND APPARATUS

(75) Inventors: David A. Frazer, Irvine, CA (US); Yuh-Ming Chen, Irvine, CA (US)

(73) Assignee: Good News Enterprises Limited, Taichung Hsien (TW)

( * ) Notice: Subject to any disclaimer, the term of this patent is extended or adjusted under 35 U.S.C. 154(b) by 294 days.

(21) Appl. No.: 10/655,910

(22) Filed: Sep. 6, 2003

(65) Prior Publication Data
US 2005/0052466 A1    Mar. 10, 2005

(51) Int. Cl.
*G09G 5/02*    (2006.01)
(52) U.S. Cl. ............... 345/600; 345/602; 345/604
(58) Field of Classification Search ............... 341/106; 345/600–602, 604, 606, FOR. 103, 122; 347/184; 348/30, 34, 41, 71, 179, 386.1, 348/538, 539; 358/3.23, 525; 382/162, 382/167, 300; 702/169; 708/233–235, 290, 708/847
See application file for complete search history.

(56) References Cited

U.S. PATENT DOCUMENTS

| 5,581,376 | A | * | 12/1996 | Harrington | 358/518 |
|---|---|---|---|---|---|
| 5,712,922 | A | * | 1/1998 | Loewenthal et al. | 382/155 |
| 6,157,937 | A | * | 12/2000 | Wakasugi | 709/290 |
| 6,571,010 | B1 | * | 5/2003 | Inoue | 382/162 |
| 2002/0067849 | A1 | * | 6/2002 | Klassen et al. | 382/162 |

\* cited by examiner

*Primary Examiner*—Matthew C. Bella
*Assistant Examiner*—G. F. Cunningham
(74) *Attorney, Agent, or Firm*—Charles C. H. Wu; Wu & Cheung, LLP

(57) ABSTRACT

An apparatus and method for converting an input image with a plurality of pixels to an output image using an N-dimensional conversion table with a plurality of nodes. The apparatus has a set of RAMS for storing odd-indexed nodes and even-indexed nodes for each dimension of the N-dimensional table. The apparatus also has means for retrieving for each pixel a set of output color values corresponding to nodes adjacent to the pixel in the conversion table. Finally, the apparatus has means for interpolating within each set of output color values to produce the output image.

24 Claims, 6 Drawing Sheets

COLOR CONVERSION METHOD AND APPARATUS

BACKGROUND OF THE INVENTION

1. Field of the Invention

The invention relates in general to image processing. More particularly, this invention relates to a method and apparatus that accelerates color space conversion by employing a multi-dimensional and multi-port memory.

2. Description of the Related Art

Color Copiers or other imaging devices capture an image from an input device and attempt to create a suitable duplicate on an output device.

The input device has inherent properties and characteristics with regard to the sensing process in a document. An example of an input device is a Charged Coupled Device ("CCD") scanner. A CCD sensor is typically composed of three sensors for each pixel to be sensed. Each of the three sensors responds to a different wavelength of light. Typically, the wavelengths are close to Red, Green and Blue (RGB).

The output device has inherent characteristics with regard to the process of creating an image. One such example is a color laser printer. The output device typically creates an image using four different colors, i.e. Cyan, Magenta, Yellow and Black (CMYK).

Color Management is defined as the task of accurately converting color information of one form or space to that of another space. This might be compared to the way that points in space or in a graph can be converted from a Euclidean space to a Spherical or other coordinate system.

The classical "textbook" method for converting color from one representation to another is by matrix multiplication. A three-component (e.g. RGB) element is multiplied by 3×3 matrix to generate a value in the new space. Industry standards exist for these matrices, such as those used in color television or JPEG compression.

The matrix-multiplication method demands that the conversion process be rather ordinary, in that the three-dimensional surface generated is continuous and without irregularities. For best results, one might desire that a different 3×3 matrix value set be used to convert various regions of the input color space. This is rather cumbersome, and the typical implementation is by table lookup.

The lookup process uses a table, usually implemented in memory such as SRAM or DRAM, that provides an output value for every input value. However, such a method requires a large amount of memory. For example, table-based color space conversion from RGB to CMYK would ideally translate every incoming 24-bit RGB value to a unique CMYK value. This would require a table with 16 million entries of 32 bits, or 64 MB of memory.

Due to practical limits on the size of the memory that can be used to store the color lookup table, only discrete data points, or nodes, are stored in the color lookup table. As a result, it is often necessary to interpolate between a set nodes adjacent to a given image color to determine the desired output color for a destination device.

Typically, the adjacent nodes are separately accessed from the lookup table, thus requiring multiple accesses to memory. For example, in the three-dimensional RGB input space, a set of eight nodes forming a cube around a color pixel must be accessed. This proves to be inefficient, given the plurality of pixels in input images.

Therefore, the need arises for an image processing device that allows for a single access of memory for interpolation of data points, thereby expediting input image conversion.

In U.S. Pat. No. 6,246,396, Gibson discloses an apparatus for converting an input image in an input color space to an output image in an output color space. Gibson does not interleave memory by placing odd and even indices into separate lookup tables. The subject invention separates odd and even indices for all three dimensions, resulting in eight separate lookup tables.

SUMMARY OF THE INVENTION

Accordingly, one object of the present invention is to provide an image processing device that expedites color space conversion.

A second object of the invention is to provide an image processing device that allows for a single access of memory for interpolation of data points.

A third object of the invention is to provide an image processing device color space conversion in multiple dimensions.

A fourth object of the invention is to provide an image processing device color space conversion using multiple ports.

To achieve these and other advantages and in accordance with the purpose of the invention, as embodied and broadly described herein, the invention provides an apparatus and method for converting an input image with a plurality of pixels to an output image using an N-dimensional conversion table with a plurality of nodes. The apparatus has a set of RAMS for storing odd-indexed nodes and even-indexed nodes for each dimension of the N-dimensional table. The apparatus also has means for retrieving for each pixel a set of output color values corresponding to nodes adjacent to the pixel in the conversion table. Finally, the apparatus has means for interpolating within each set of output color values to produce the output image.

DESCRIPTION OF THE PREFERRED EMBODIMENTS

Figure 1:
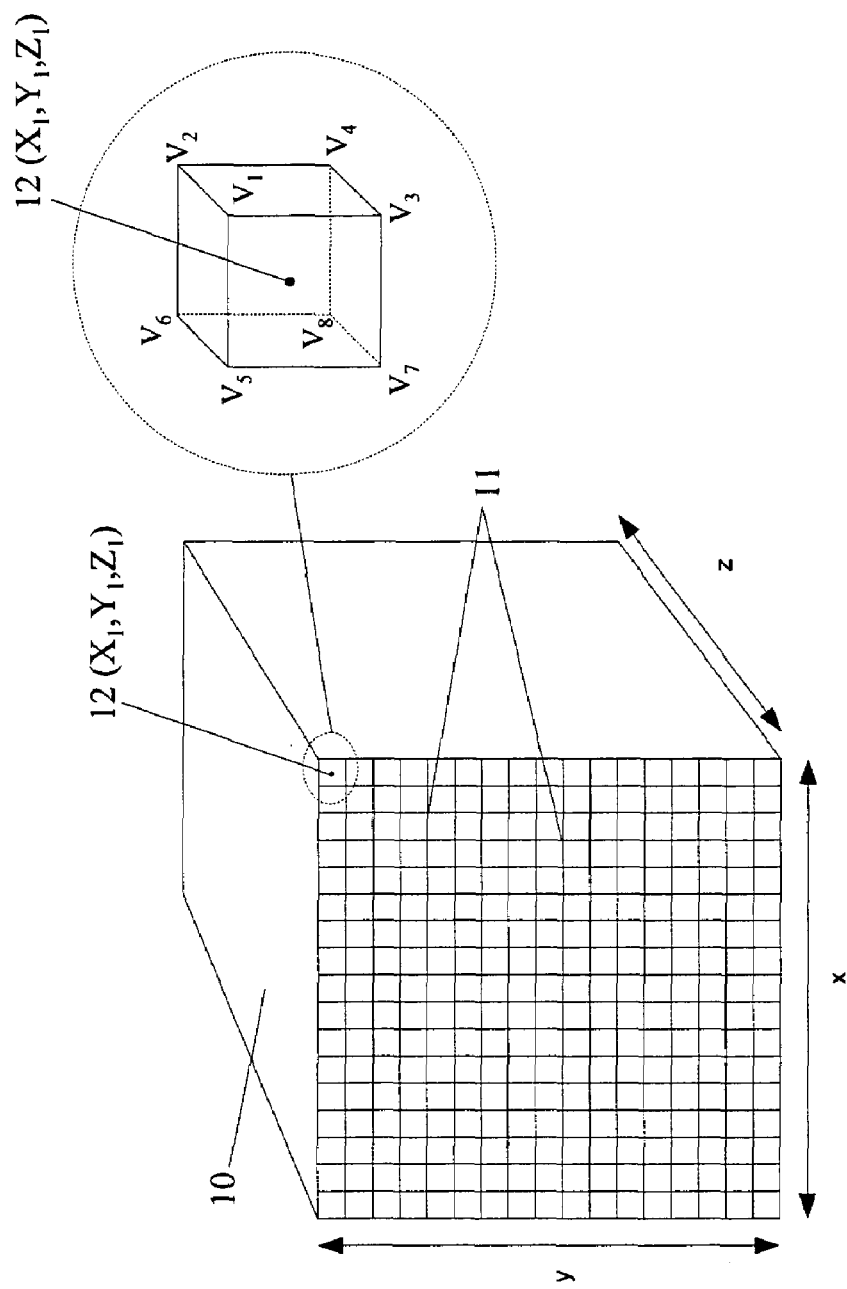
FIG. 1 is a graphical depiction of a prior art lookup table in three-dimensions.

Referring now to FIG. 1, a graphical depiction of a prior art lookup table in three-dimensions is shown. The three-dimensional lookup table can be envisioned as a cube 10 containing nodes 11 at predetermined addresses along the X, Y and Z axes.

Still referring to FIG. 1, an input color 12 contains address components $X_1$, $Y_1$ and $Z_1$. Typically, input color 12 will not coincide exactly with the predetermined address of a node.

Therefore, address components $X_1$, $Y_1$ and $Z_1$ are used to determine 8 vertices $V_1$ thru $V_8$ adjacent to input color 12. Vertices $V_1$ thru $V_8$ all fall within a cube. Given the index coordinate of (x,y,z), for example, the following locations will be read: (x,y,z), (x,y+1,z), (x,y,z+1), (x,y+1,z+1), (x+1, y,z), (x+1,y+1,z), (x+1,y,z+1) and (x+1,y+1,z+1). An output value corresponding to input color 12 is approximated by interpolation of vertices $V_1$ thru $V_8$.

Still referring to FIG. 1, obtaining an output value for input color 12 requires separately accessing vertices $V_1$ thru $V_8$. This is because the lookup table is implemented on a single SRAM. Because a single memory bank is used, 8 separate accesses to memory are necessary to process every pixel in a given input image. This proves to be an inefficient process for color space conversion.

Figure 2:
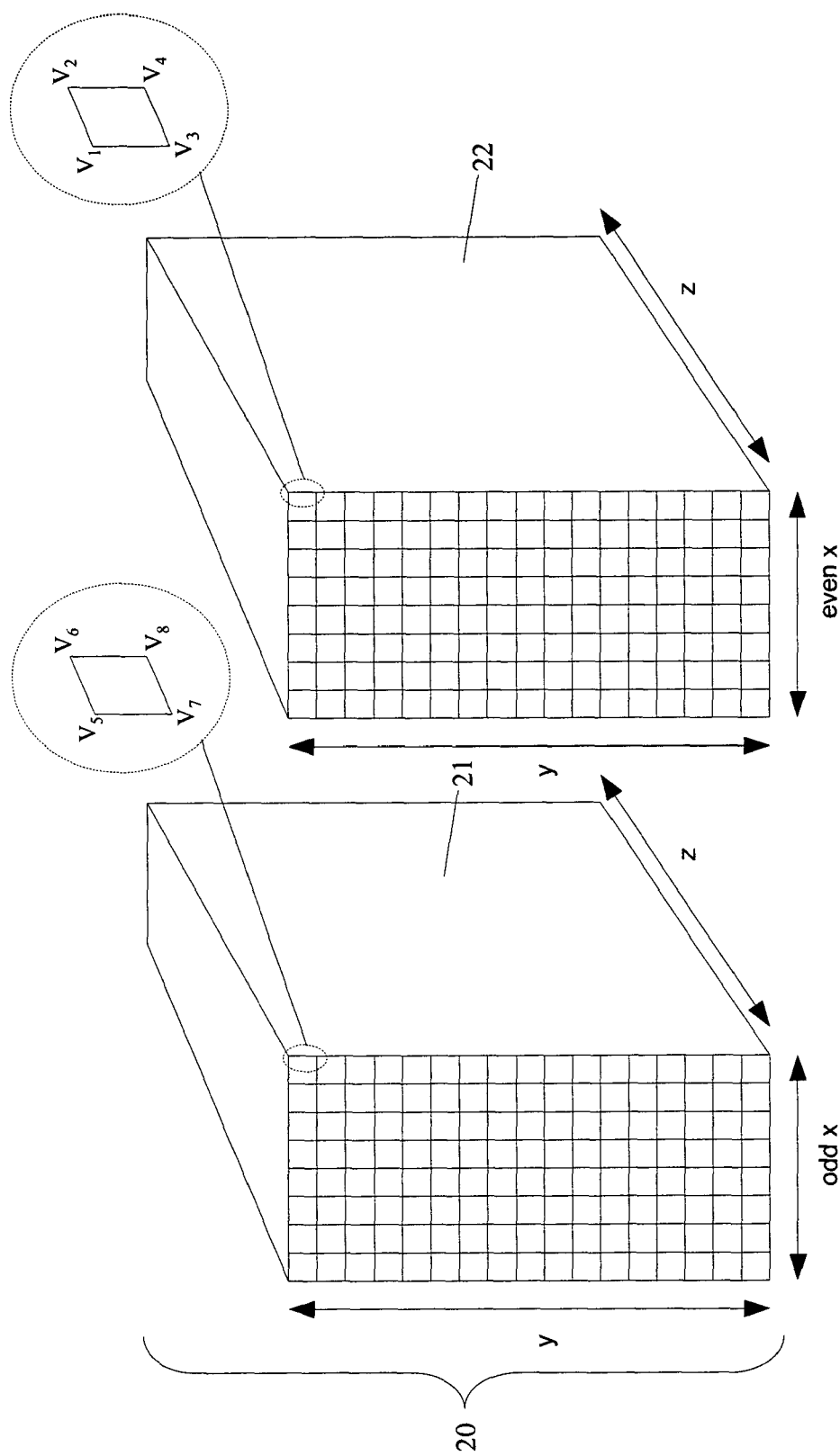
FIG. 2 is a graphical depiction of a three-dimensional lookup table separating odd and even indices along the X-axis.

With reference to FIG. 2, a graphical depiction of a three-dimensional lookup table separating odd and even indices along the X-axis is shown. In this embodiment, each half of the lookup table 20 is implemented on a separate SRAM. By dividing the lookup table 20 into two pieces 21 and 22, vertices $V_1$ thru $V_4$ can be accessed at the same time as vertices $V_5$ thru $V_8$. All 8 vertices need not be separately accessed from memory. Instead, 2 groups, each containing 4 nodes, can be simultaneously accessed from their respective SRAM. This procedure cuts the time to access the 8 nodes surrounding input color 12 in half.

Figure 3:
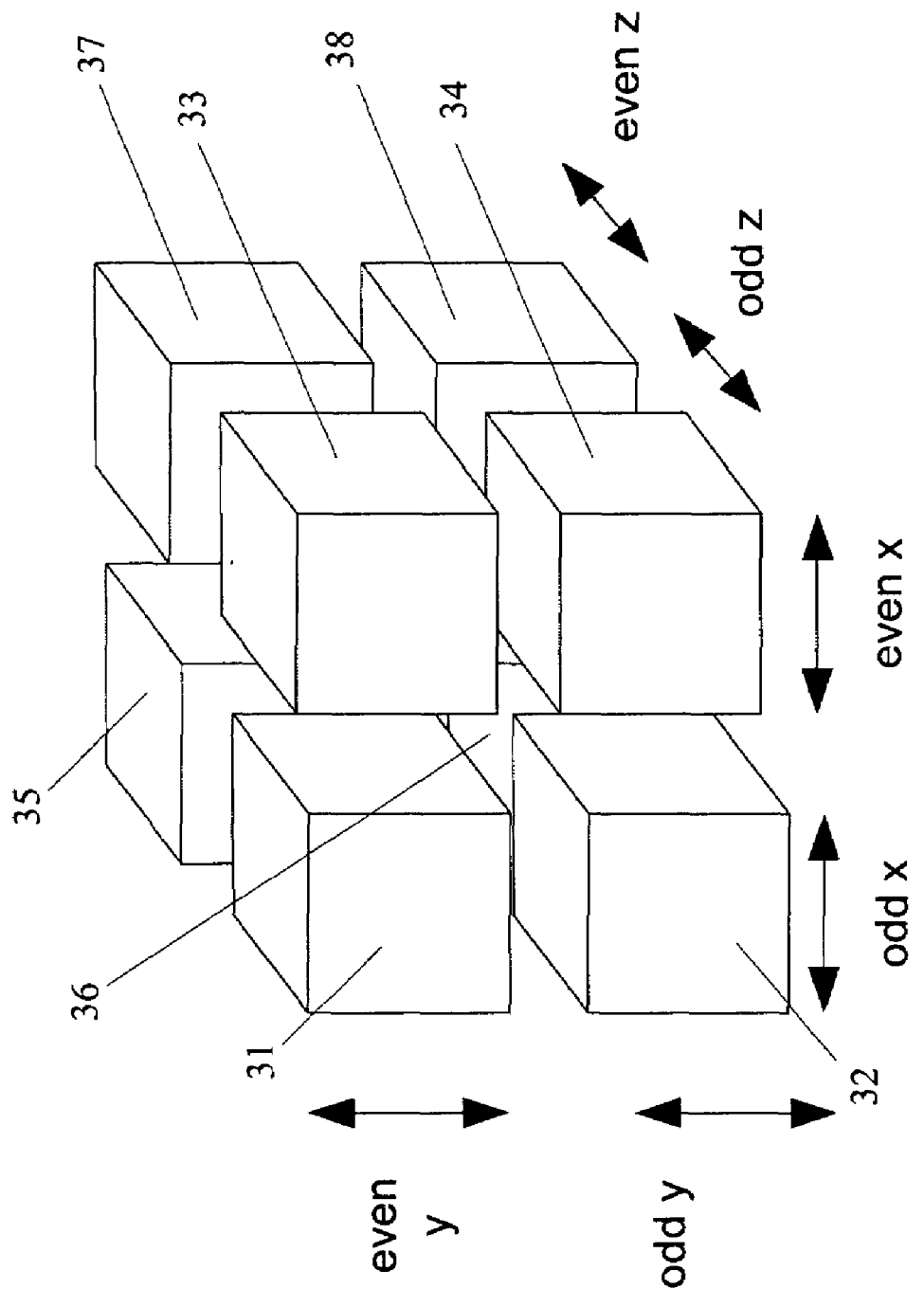
FIG. 3 is a graphical depiction of a three-dimensional lookup table in accordance with the present invention.

Referring now to FIG. 3, a graphical depiction of a three-dimensional lookup table in accordance with the present invention is shown. The lookup table separates odd and even indices along the X-axis, Y-axis and Z-axis. In this embodiment, each of the eight portions of the lookup table is implemented on a separate SRAM. By dividing the lookup table into cubes 31 thru 38, vertices $V_1$ thru $V_8$ corresponding to input color 12 can be accessed at the same time. Instead of performing separate accesses to memory for each of these vertices, all output values of the vertices are simultaneously obtained.

Figure 4:
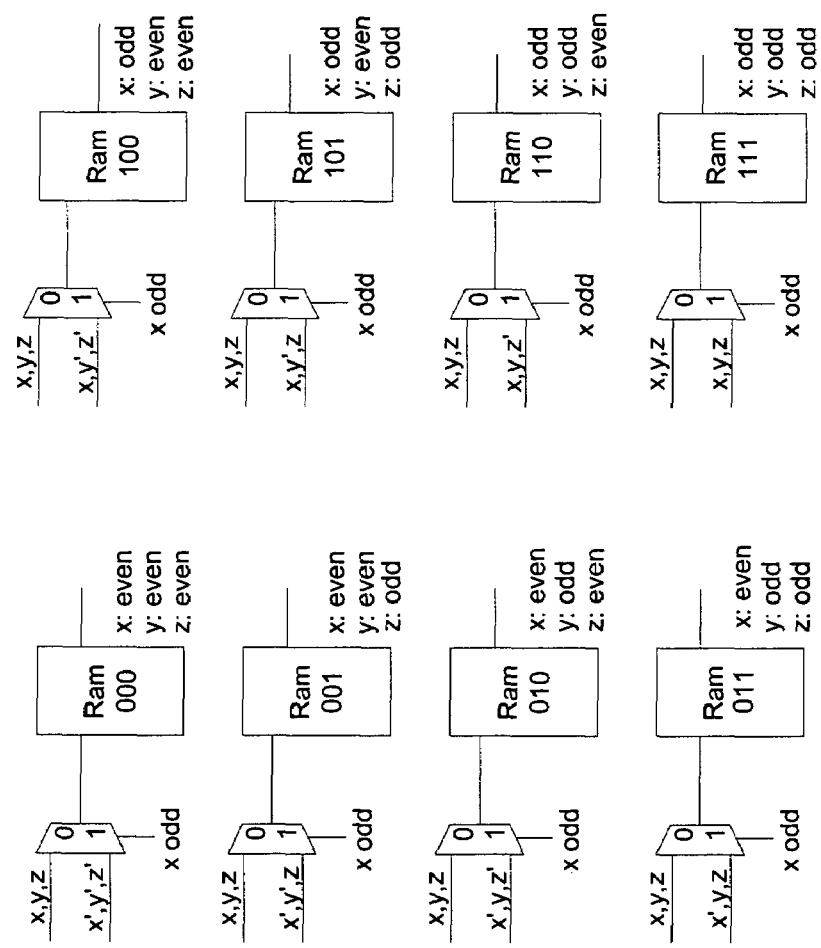
FIG. 4 is a diagram illustrating address increment hardware for the present invention.

With reference to FIG. 4, a diagram illustrating address increment hardware for the present invention is shown. For purposes of this example, a 1-dimensional table with 17 elements will be used. The index into the table is a five-bit number with valid values from binary 00000b to 10000b, or from 0 to 16 inclusive. Given an algorithm that requires simultaneous access to two table elements at indices (or addresses) of n and n+1, the table is split into two separate tables with one containing the contents of all the even addresses and another containing all of the odd addresses. When the index into the table is even (e.g. 0, 2, 4 . . . ) then the index of 000b (the three most significant bits of the index value) into each table will in fact retrieve the values from addresses 00000b and 00001b from the original table.

Still referring to FIG. 4, when the index is an odd value, then the even table address needs to be incremented. For example, if the 4 most significant bits of the input color are 0101b, then locations 0101b and 0110b will be accessed from the original un-split table. In the split table arrangement, only the 3 most significant bits of the input color are used, so the input address would be 010b. At address 0010, values of 4 and 5 will be retrieved, but the subsequent value from the even table is needed. Hence when the four most significant bits of the input color are odd, the address to the even table must be incremented in order to retrieve the desired values from entries n and n+1 of the original, un-split table. This concept must be extended to all three dimensions.

Figure 5:
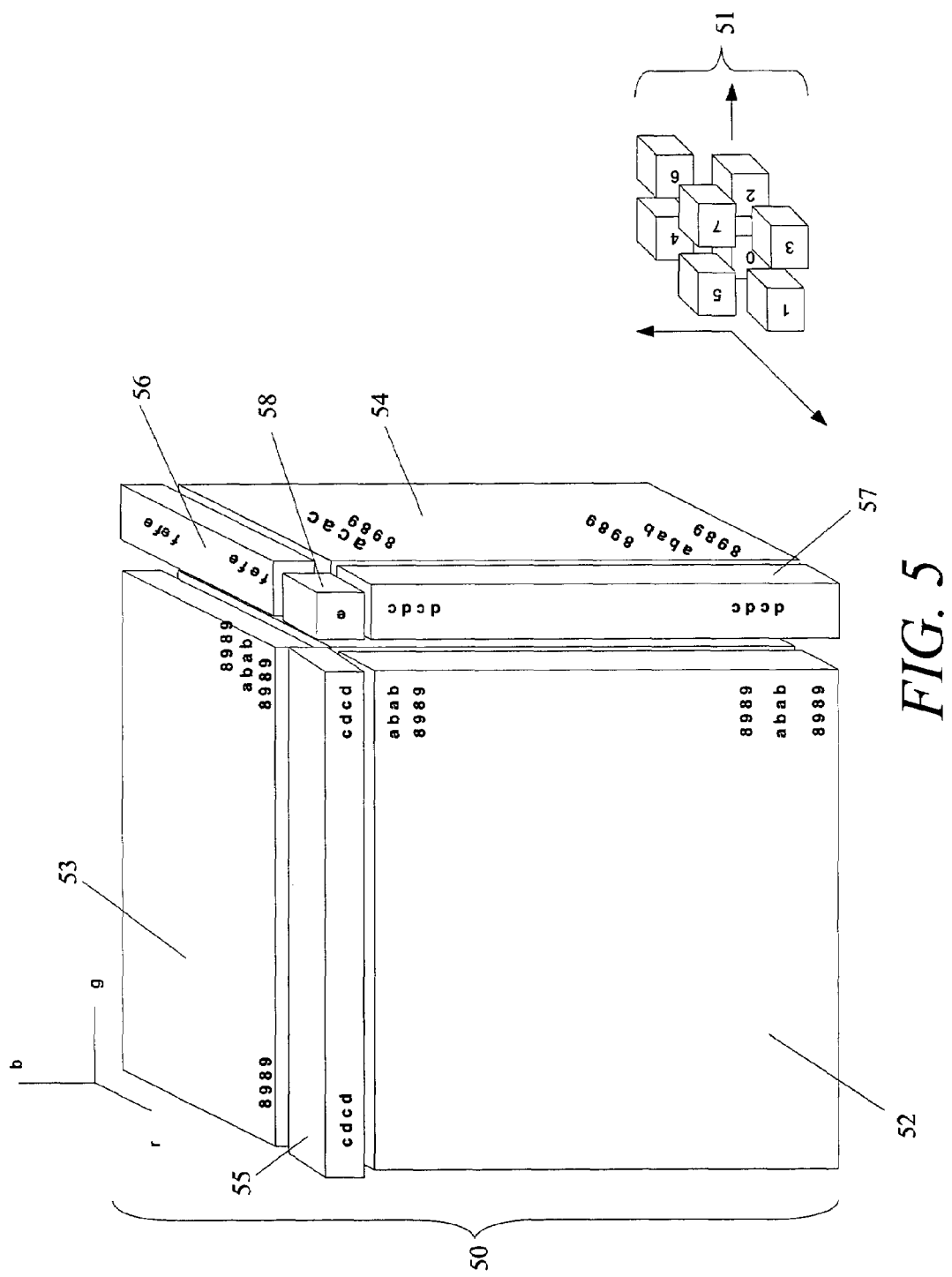
FIG. 5 is a graphical depiction of the distribution of RAMS within a three-dimensional lookup table for the present invention.

Referring now to FIG. 5, a graphical depiction illustrating the distribution of RAMS within a three-dimensional lookup table for the present invention is shown. This embodiment shows a 17×17×17 lookup table formed as a cube 50. The lookup table is composed of a 16×16×16 core 51 implemented in 8 RAMS.

Still referring to FIG. 5, faces 52 thru 54, edges 55 thru 57 and corner 58 form a skin around core 51. Faces 52 thru 54 are 1×16×16 each, edges 55 thru 57 are 1×1×16 each, and corner 58 is 1×1×1. Faces 52 thru 54, edges 55 thru 57 and corner 58 are implemented on RAMS separate from the core. Like the core, the additional RAMS are implemented by separating odd and even indices in the appropriate number of dimensions. This allows for simultaneous access of vertices $V_1$ thru $V_8$ for input color 12.

Figure 6:
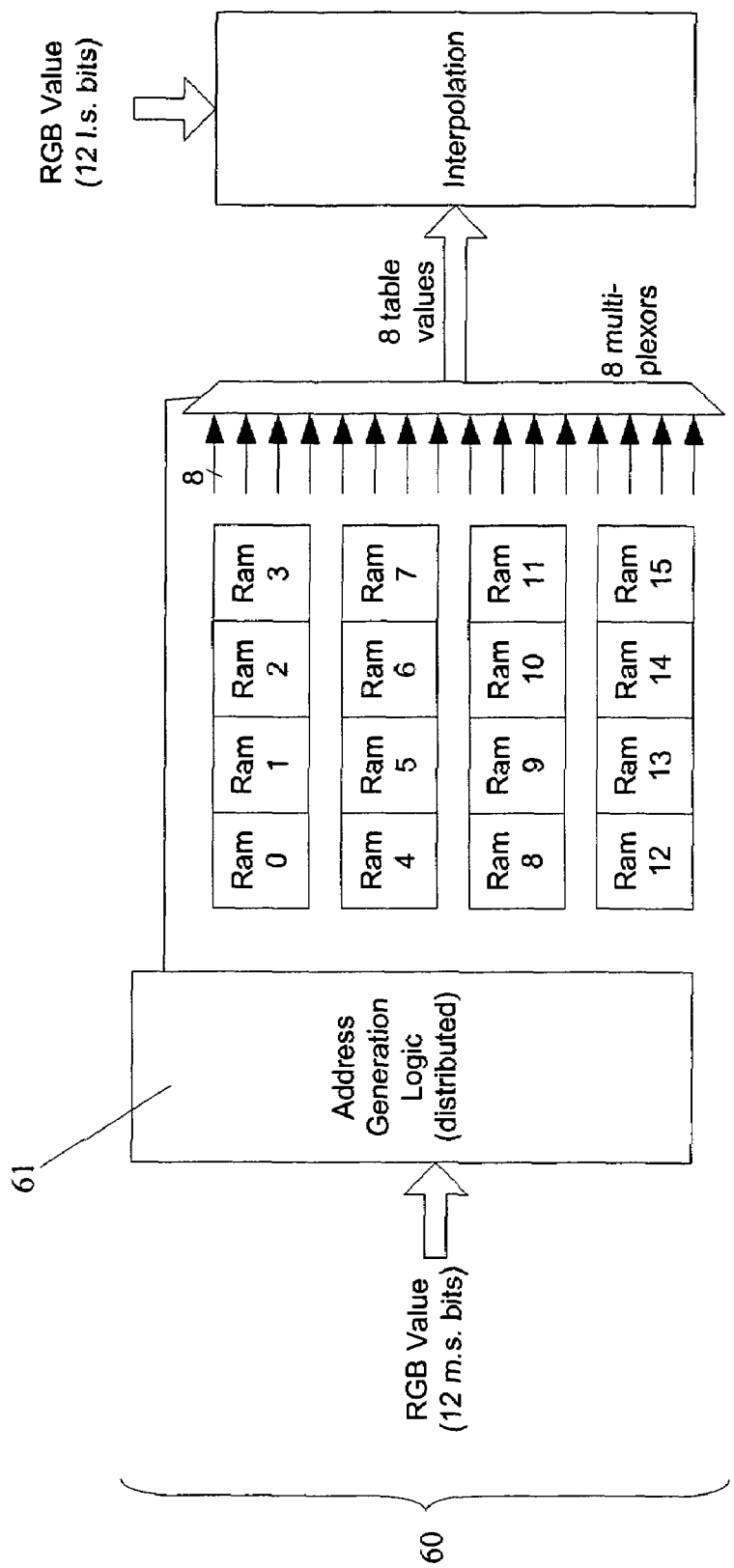
FIG. 6 is a diagram illustrating the hardware configuration for the lookup table of FIG. 5.

With reference to FIG. 6, a diagram illustrating the hardware for lookup table of FIG. 5 is shown. For purposes of this embodiment, 24-bit incoming color data will be used. Only the four most significant bits of each color component are used to index into the table, and the lower four bits will be used for a three-dimensional interpolation within the 8 value cube that is supplied by the table.

Still referring to FIG. 6, index values 0 thru 14 within the 4-bit range of 0 thru 15 will only access the inner 8 RAMS, i.e. RAMS 0 thru 7. The inner 8 RAMS represent core 50 in FIG. 5. When any of the color components equals 15, some components will be retrieved from the outer 8 RAMS, i.e. RAMS 8 thru 15. The outer 8 RAMS represent faces 52 thru 54, edges 55 thru 57 and corner 58 in FIG. 5.

Still referring to FIG. 6, hardware 60 includes address generation logic 61 for accessing RAMS 0 thru 15. Address generation logic 61 determines which points of the eight vertices of the cube will come from which RAMS.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for converting an input image with a plurality of pixels to an output image using an N-dimensional conversion table with a plurality of nodes, the method comprising the steps of:

providing an input image with a plurality of pixels;

converting the input image to an output image using an N-dimensional conversion table with a plurality of cubes each having a plurality of nodes, the N-dimensional conversion table being composed of a plurality of at least four subsets of cubes having nodes with each subset containing color information adapted to be simultaneously obtained;

storing odd-indexed nodes and even-indexed nodes respectively on separate memory components for each dimension of the conversion table;

retrieving for each pixel a set of output color values corresponding to nodes adjacent to the pixel in the conversion table; and interpolating within each set of output color values to produce the output image;

thereby expediting input image conversion using a single access of memory for interpolation of data points.

2. The method according to claim 1 wherein each pixel has N color components.

3. The method according to claim 2 wherein each color component allocates bits for indexing into the conversion table.

4. The method according to claim 2 wherein each color component allocates bits for interpolation.

5. The method according to claim 1 wherein the set of output values are capable of being simultaneously accessed from the memory components.

6. The method according claim 1 wherein the input image is in the RGB color space.

7. The method according to claim 1 wherein the output image is in the CMYK color space.

8. The method according to claim 1, wherein said memory components are random access memory (RAM).

9. The method according to claim 8, wherein said RAM is battery-backed static RAM.

10. The method according to claim 1, wherein said memory components are non-volatile memory components.

11. The method according to claim 10, wherein said non-volatile memory components are MRAMs (Magnetic RAM).

12. The method according to claim 10, wherein said non-volatile memory components are PRAMs (Phase-change RAM).

13. The method according to claim 10, wherein said non-volatile memory components are FeRAMs.

14. An apparatus for converting an input image with a plurality of pixels to an output image using an N-dimensional conversion table with a plurality of nodes, the apparatus comprising:
- a set of at least three memory components for storing separately odd-indexed nodes and even-indexed nodes respectively for each dimension of the conversion table, wherein the conversion comprises a plurality of cubes each having a plurality of nodes;
- means for retrieving for each pixel a set of output color values corresponding to nodes adjacent to the pixel in the conversion table; and
- means for interpolating within each set of output color values to produce the output image.

15. The apparatus according to claim 14 wherein each pixel has N color components.

16. The apparatus according claim 15 wherein each color component allocates bits for indexing into the conversion table.

17. The apparatus according to claim 15 wherein each color component allocates bits for interpolation.

18. The apparatus according to claim 14 wherein the set of output values are capable of being simultaneously accessed from the set of memory components.

19. The apparatus according to claim 14 wherein the input image is in the RBG color space.

20. The apparatus according to claim 14 wherein the output image is in the CMYK color space.

21. The apparatus according to claim 14, wherein said memory components are random access memory (RAM).

22. The apparatus according to claim 21, wherein said RAM is battery-backed static RAM.

23. The apparatus according to claim 14, wherein said memory components are non-volatile memory components.

24. The apparatus according to claim 23, wherein said non-volatile memory components are selected from the group consisting of MRAMS (Magnetic RAM), PRAMs (Phase-change RAM), FeRAMs.

* * * * *